{ United States Patent Office  2,712,544  Patented July 5, 1955 }

2,712,544

CHELATING AGENTS

Frederick C. Bersworth, Verona, N. J., assignor to The Dow Chemical Company, Midland, Mich., a corporation of Delaware No Drawing. Application October 16, 1953,
Serial No. 386,649

6 Claims. (Cl. 260—348)

This invention relates to the preparation of amino acids and has for its object the provision of a method of producing mono and poly acid salts which are extremely useful as metal ion chelating agents in aqueous and non-aqueous solutions and as intermediates in the synthesis of other high molecular weight compounds.

The object of the invention is to provide epoxy polyamino acetic acid salts conforming to the following formula:

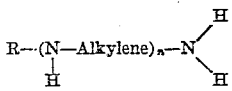

wherein R is an alkyl group containing a plurality of carbon atoms which number may be as many as 10 to 20 or more and the chain may be branched but is characterized by the fact that on two adjacent carbon atoms there is attached an oxygen atom

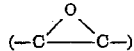

where $n$ is an integer equal to 1, 2, 3, 4 or more; wherein at least one of the amino hydrogens has been displaced by an acetate group ($CH_2.COOM$) or propionic acid group and salts thereof wherein M is an alkali metal; and wherein Alkylene is an alkyl group which adds 2 to 3 carbon atoms to the chain between the nitrogen atoms and is typified by ethylene.

Another object is to provide epoxy poly amino acetic acid salts conforming to the following formula:

wherein R is an alkyl group containing a plurality of carbon atoms which number may be as many as 10 to 20 or more and the chain may be branched but is characterized by the fact that on two adjacent carbon atoms there is attached an oxygen atom

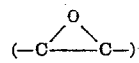

and wherein at least one H is displaced by an acetate group ($CH_2.COOM$) wherein M is an alkali metal.

A further object is to provide a method of producing the said epoxy polyamino acetic acid salts.

Other objects and advantages will be apparent as the invention is more fully hereinafter disclosed.

This application is a continuation-in-part of my prior application Serial No. 281,898, filed April 11, 1952, now abandoned, which in turn is a continuation-in-part of my application Serial No. 99,365, filed June 15, 1949.

In accordance with these objects I have discovered that poly-hydroxy alkyl polyamino acetic acid salts of the alkali metals which contain hydroxy groups on adjacent carbon atoms of the alkyl group can be converted into the epoxy salts by extended heating of the same while in suspension in xylene or toluene at a temperature at which an azeotropic mixture of water and xylene (or toluene) distills, and that the resulting epoxy salt is a highly reactive intermediate from which a large number of high molecular weight organic compounds may be derived and is also highly reactive in aqueous and non-aqueous solutions as a metal ion chelating agent.

Poly-hydroxy alkyl polyamino mono and poly acetic acid salts may be prepared in a number of different ways. One of the best and most satisfactory ways to prepare these polyhydroxy amino acid salts is by the method described and claimed in my prior United States Patent 2,407,645, issued September 17, 1946.

In accordance with the method of this prior patent a poly-hydroxy alkyl polyamine that has at least one displaceable amino hydrogen therein is carboxy-methylated to displace the said amino hydrogen with an acetate group ($CH_2.COOM$) wherein M is an alkali metal) by condensing formaldehyde with sodium cyanide in an alkaline pH aqueous solution in the presence of the poly amine while maintaining a reaction temperature of 80°–85° C. in the solution. The condensation of formaldehyde with sodium cyanide is conducted at a rate consistent with the rate at which the condensation product hydrolyzes to an acetate substituent group for substitution reaction with the amine with evolution of gaseous ammonia ($NH_3$) from the reaction solution and the progress of the reaction can be controlled and regulated by the rate at which the gaseous ammonia is expelled from the alkaline pH solution. A low positive pressure of this gaseous ammonia is maintained over the surface of the reaction solution to exclude atmospheric gases from the reaction solution.

By careful control of the amounts of reactants and the purity of the reactants the resulting reaction solution will contain the substantially pure hydroxy alkyl poly amino mono or poly acetic acid salt of an alkali metal and this salt may be recovered from the reaction solution by evaporating off the water of solution at relatively low temperatures in a high vacuum to substantial dryness.

The dry hydroxy alkyl polyamino mono or poly acetic acid alkali metal salt thus obtained is suspended in xylene (or toluene) and heated under a condenser carrying off the distillate for an extended time until no further distillation of an azeotropic mixture of water and xylene (or toluene) can be detected in the condenser.

The resulting epoxide compound is then recovered from the xylene (or toluene) by filtration and is dried in a high vacuum to remove the last traces of xylene (or toluene).

The epoxide compounds of the present invention are all white amorphous solids that are completely soluble in water in which they tend to hydrolyze back into the hydroxy compounds. In alkaline pH solutions this tendency is increased while in acid pH solutions this tendency is suppressed and the compounds tend to polymerize into compounds of uncertain composition. In aqueous solutions above a pH of about 7 the epoxides and the hydroxy salts are active metal ion chelating agents particularly those poly acetic acid salts having acetic acid groups on spaced amino nitrogens.

The epoxide compounds are readily soluble in alcohol, ether and in liquid hydrocarbons in which solvents the compounds exhibit pronounced chelate-forming properties towards metal ions present in the solvents and pronounced dehydrating properties due to the epoxide group present therein.

As intermediates in the forming of large molecular weight compounds the epoxide group is reactive independently of the acetic acid groups to form a large number of addition compounds in which the addition group is attached directly to one of the carbons of the alkyl group forming new types of amino acids, which have yet to be fully explored.

There are a large number of poly-hydroxy poly amines known in the art which have an aliphatic carbon group attached directly to an amino nitrogen in which aliphatic group there are two hydroxyl groups attached to adjacent carbon atoms and in which there is at least one displaceable amino hydrogen. Any one of these poly amines may be used in the practice of the present invention. However, for the purpose of obtaining compounds that are utilizable primarily as metal ion chelating agents in aqueous and non-aqueous solvents therefor, I prefer to employ these poly hydroxy poly amines wherein there is a replaceable amino hydrogen on at least two of the amino nitrogens. Such a compound, for example, is 3,4-dihydroxy butyl ethylene diamine conforming to the formula:

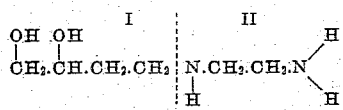

This poly hydroxy diamine when carboxy-methylated according to the process of my prior patent can be converted into the mono-, di- or tri-acetic acid sodium salt, depending upon the total number of equivalent molar reacting weights of formaldehyde and sodium cyanide employed.

It is to be noted that the portion of the molecule designated "I" carries the two hydroxyl units which are converted into the epoxy unit. The portion of the molecule identified as "II" is recognizable as being based on ethylene diamine. Accordingly, in deriving compounds of the epoxy type which have longer alkyl chains than the 4 carbons indicated in the compound above noted, it is merely necessary to start with a compound such, for example, as a dihydroxy pentyl, hexyl, heptyl, nonyl, decyl or longer alkyl chain. Chains ranging up to the stearic acid length can be used and the epoxy compounds derived with such long alkyl chains are characterized by showing strong surface active properties when the chain length reaches 16, 17 and 18 carbon atoms.

*Example I*

As one specific embodiment of the invention, but not as a limitation thereof, I will describe the present invention insofar as it has been employed in the manufacture of the triacetic acid salt of the epoxide compound of this poly hydroxy poly amine. In the production of this compound, one molar weight of the 3,4-dihydroxy butyl ethylene diamine is added to a reaction solution containing 3 molar weights of sodium cyanide and a sufficient amount of sodium hydroxide to give a solution pH of about 8. The reaction solution is heated to a temperature of about 80°–85° C. in a container sealed from the atmosphere except through a pressure release valve venting the gases from the interior to the atmosphere through an ammonia absorption tower at a pressure of about 3–4 pounds. An aqueous solution containing 3 molar weights of formaldehyde is fed slowly into the heated solution with vigorous agitation of the reaction solution, the rate of feed of the formaldehyde solution being at a rate consistent with the rate of NH3 evolution from the solution to maintain the rate of evolution substantially constant. After all of the formaldehyde solution has been fed into the reaction solution the heating of the solution is continued for an extended time sufficient to permit the reaction to come to equilibrium.

The water of solution of the reaction solution is then evaporated off at a temperature of about 45° C. under high vacuum until a substantially dry product is obtained.

This product is then suspended in a large volume of xylene (or toluene) and the suspension is heated under a condenser at a temperature of 100°–130° C. until the distillation of an azeotropic mixture of water and xylene (or toluene) ceases.

The epoxide compound resulting is then separated from the xylene (or toluene) by filtration and is dried in vacuo to remove the last traces of the xylene (or toluene).

Analysis of this epoxide shows it to conform to the following formula:

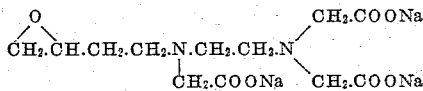

*Example II*

When 3,4-dihydroxy butyl propylene diamine is similarly carboxy-methylated and the amino acid salt dehydrated to the epoxide as described in Example I, the following epoxide is obtained:

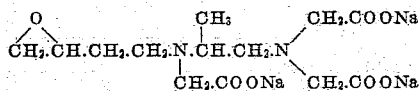

*Example III*

Many of the poly hydroxy alkyl poly amines utilizable in the present invention are not available on the market but the corresponding epoxy compounds may be prepared in a somewhat different manner. As an example, when one molar weight of 1-chloro-2-pentene is refluxed with an equivalent amount of triethylene tetraamine in aqueous ethanol for an extended time (about 2 hours) and the resulting compound is carboxy-methylated as described in Example I using 5 moles each of sodium cyanide and formaldehyde, the resulting amino acid salt may be recovered from the reaction solution by evaporating off the major portion of the water of solution and precipitating with ethanol. The white solid product obtained is an amino acid conforming to the following composition:

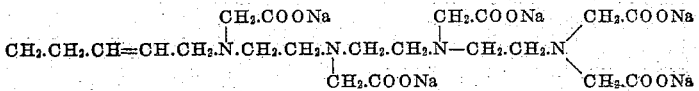

This compound when treated with about 1.1–1.2 molar weights of benzoyl peroxide while in suspension in anhydrous dioxane heated to 50° C. for about 5 hours is converted into an epoxide conforming to the following formula:

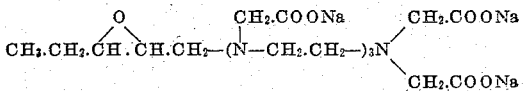

This epoxide precipitates out of the dioxane solution on cooling and is isolated therefrom by filtration and washing with absolute ethanol or methanol.

*Example IV*

As an alternative practice the following process may be employed:

One mole of 2,3-dihydroxy-1-propylamine,

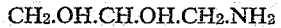

is treated in aqueous solution at 60° C. with one mole of 1-amino-3-chloropropane-N,N-diacetic acid. Three mols of sodium hydroxide are added slowly as the reaction proceeds, the addition being complete at the end of an hour. After a total of four hours reaction time a mole of sodium chloroacetate is added and the reaction is continued for two hours more. The reaction solution is strongly acidified with concentrated hydrochloric acid, and the water is slowly replaced with anhydrous ethanol while simultaneously distilling the reaction mixture. A solution of the amino acid hydrochloride is thus formed, from which the sodium chloride formed precipitates completely. After filtration of the sodium chloride the remaining hydrogen chloride is removed by repeated distillation of ethanol from the solution. The product is then neutralized with exactly three moles of sodium hydroxide per mole of dihydroxyamino acid present, and the precipitated trisodium salt is filtered and dehydrated with xylene according to the method described in Example I. The final product has the formula:

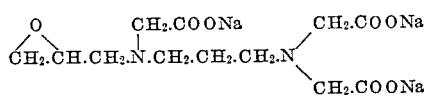

It will be apparent from these examples that the synthesis is characterized by being carried out in a strongly alkaline medium such that the replaceable amino hydrogens are replaced with carboxylic acid groups and appear as the alkali metal salts thereof. To derive an epoxy compound with any desired chain length in the position indicated, it is necessary merely to start with an amine having the adjacent hydroxyl groups on a chain of sufficient length. The carboxymethylation of the amino hydrogens occurs without interference with the epoxy unit. In this fashion compounds having alkyl groups therein ranging in length up to 18 and 20 carbon atoms, which are the most conveniently available compounds, are formed.

It is accordingly apparent from the description that epoxide compounds corresponding to the generic formula may be readily derived and may be modified without essentially departing from the spirit or scope of the invention.

What I claim is:

1. Epoxide compounds conforming to the following formula:

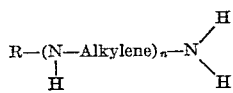

wherein R is an alkyl group containing two carbon atoms to about 20 carbon atoms and has attached on two adjacent carbon atoms an oxygen atom to form the group

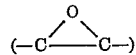

wherein Alkylene is a low molecular weight alkylene group which places two to three carbon atoms in the chain between the nitrogen atoms, and wherein $n$ is an integer having a value of one to about four, and wherein at least one amino hydrogen is displaced by an acetic acid group (—CH$_2$COOM) and M is selected from the group consisting of hydrogen, ammonium bases and alkali metals.

2. The epoxide compound conforming to the following formula:

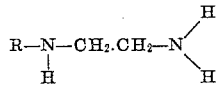

wherein R is an alkyl group containing 2 carbon atoms to about 20 carbon atoms to two adjacent carbon atoms of which there is attached an oxygen atom

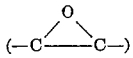

and wherein at least one amino hydrogen is displaced by an acetic acid group (—CH$_2$COOM) where M is selected from the group consisting of hydrogen, ammonium bases and alkali metals.

3. The epoxide compound conforming to the formula:

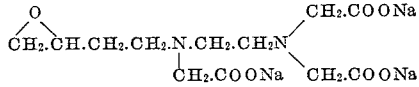

4. The epoxide compound conforming to the formula:

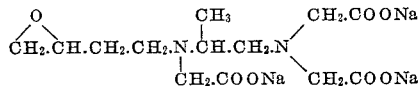

5. The epoxide compound conforming to the formula:

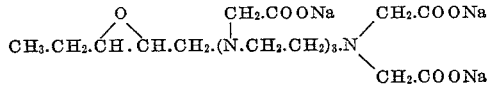

6. The epoxide compound conforming to the formula:

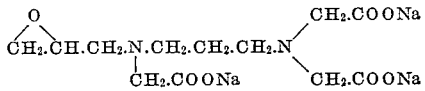

No references cited.